US007292624B2

(12) United States Patent
Mayor et al.

(10) Patent No.: US 7,292,624 B2
(45) Date of Patent: Nov. 6, 2007

(54) METHOD AND APPARATUS FOR ROBUST ACQUISITION OF SPREAD SPECTRUM SIGNALS

(75) Inventors: Michael A. Mayor, Fort Wayne, IN (US); Lester G. Matheson, Albion, IN (US); Robert D. Martin, Decatur, IN (US); John H. Gass, Fort Wayne, IN (US); Mhairi N. McCune, Fort Wayne, IN (US)

(73) Assignee: ITT Manufacturing, Inc., Wilmington, DE (US)

( * ) Notice: Subject to any disclaimer, the term of this patent is extended or adjusted under 35 U.S.C. 154(b) by 709 days.

(21) Appl. No.: 10/227,836

(22) Filed: Aug. 27, 2002

(65) Prior Publication Data

US 2004/0042535 A1 Mar. 4, 2004

(51) Int. Cl.
*H04B 1/00* (2006.01)

(52) U.S. Cl. ...................................... 375/150; 375/152

(58) Field of Classification Search ................ 375/130, 375/140, 150, 152, 147
See application file for complete search history.

(56) References Cited

U.S. PATENT DOCUMENTS

| | | | | |
|---|---|---|---|---|
| 5,311,544 | A * | 5/1994 | Park et al. | 375/152 |
| 5,383,220 | A * | 1/1995 | Murai | 375/150 |
| 5,548,613 | A * | 8/1996 | Kaku et al. | 375/150 |
| 5,732,111 | A * | 3/1998 | Walley | 375/344 |
| 5,793,796 | A * | 8/1998 | Hulbert et al. | 375/150 |
| 5,848,096 | A * | 12/1998 | Shou et al. | 375/147 |
| 6,385,232 | B1 * | 5/2002 | Terashima | 375/149 |
| 7,075,948 | B2 * | 7/2006 | Makarov | 370/503 |

* cited by examiner

*Primary Examiner*—Chieh M. Fan
*Assistant Examiner*—Freshteh N Aghdam
(74) *Attorney, Agent, or Firm*—Davidson Berquist Jackson & Gowdey LLP

(57) ABSTRACT

A Direct Sequence Spread Spectrum receiver is described in which a complex spread spectrum signal is cross correlated by four digitally matched filters. The filters and subsequent multipliers correlate the in-phase and quadrature components as well as the current and previous symbols. The result is a more robust signal acquisition at very low signal to noise ratios.

14 Claims, 2 Drawing Sheets

METHOD AND APPARATUS FOR ROBUST ACQUISITION OF SPREAD SPECTRUM SIGNALS

BACKGROUND AND SUMMARY OF THE INVENTION

Direct Sequence Spread Spectrum is a data transmission method that allows a number of wireless receivers to communicate on a common frequency spectrum by spreading respective transmission signals over the spectrum using unique code sequences for each transmission. Because multiple transmissions are being communicated on the common frequency spectrum at the same time, the respective communications thereon are indistinguishable from each other without knowing the corresponding code sequences. The code sequences, sometimes referred to a pseudo-noise codes, are employed to spread the desired signal on the transmission end and de-spread the desired signal on the reception end. At the transmission end, the desired waveform signal energy is spread over a bandwidth much greater than the signal information bandwidth. At the receiver end, the signal is de-spread using a synchronized replica of the pseudo-noise code.

In FIG. 1, a prior art spread spectrum receiver is shown. There, the baseband signals $RX_I$ and $RX_Q$, which are composed of a series of symbols, are received at chip matched filters 10A and 10B. De-spreading occurs by correlation of the received symbols with locally generated pseudo-noise sequences $PN_I$ and $PN_Q$ from PN replicator 13. The correlations are obtained at the multipliers 12A and 12B and integrators 14A and 14B. The de-spread signals may be further processed via a signal acquisition block 15. The result from the signal acquisition block is the original desired signal.

The pseudo-noise codes employed in spreading and de-spreading take various forms, with different associated problems and advantages. The PN replicator 13 can also take various forms. The present invention is not limited to the kind or nature of the spreading code. One form of PN replicator employs a digitally matched filter that analyzes the incoming series of symbols to determine a match value (or "correlation") identifying how well a subset series of symbols matches a known pseudo-noise code. The output of the digitally matched filter is thus a series of correlation values associated with different sets of received symbol strings.

DSSS transmission signals can be spread via the pseudo-noise code to signal levels that may fall below baseline noise levels. Very low signal to noise ratios are common and can result in poor signal acquisition. The present invention involves a method of establishing more robust signal acquisition at very low signal to noise ratios for DSSS signals. This more robust acquisition is achieved on a complex signal by four cross-coupled digitally matched filters operating simultaneously on the in-phase and quadrature components as well as the current and previous symbols.

DETAILED DESCRIPTION OF THE INVENTION

In conventional DSSS receivers the desired signal is acquired by mixing a pseudo-noise (pn) code with a received signal to de-spread the received signal. One way that conventional systems perform that function is to employ a pn replicator 13 that re-generates the same pn code used by the transmitter, and then employs that pn-code to de-spread the received (spread) signal.

Figure 1:
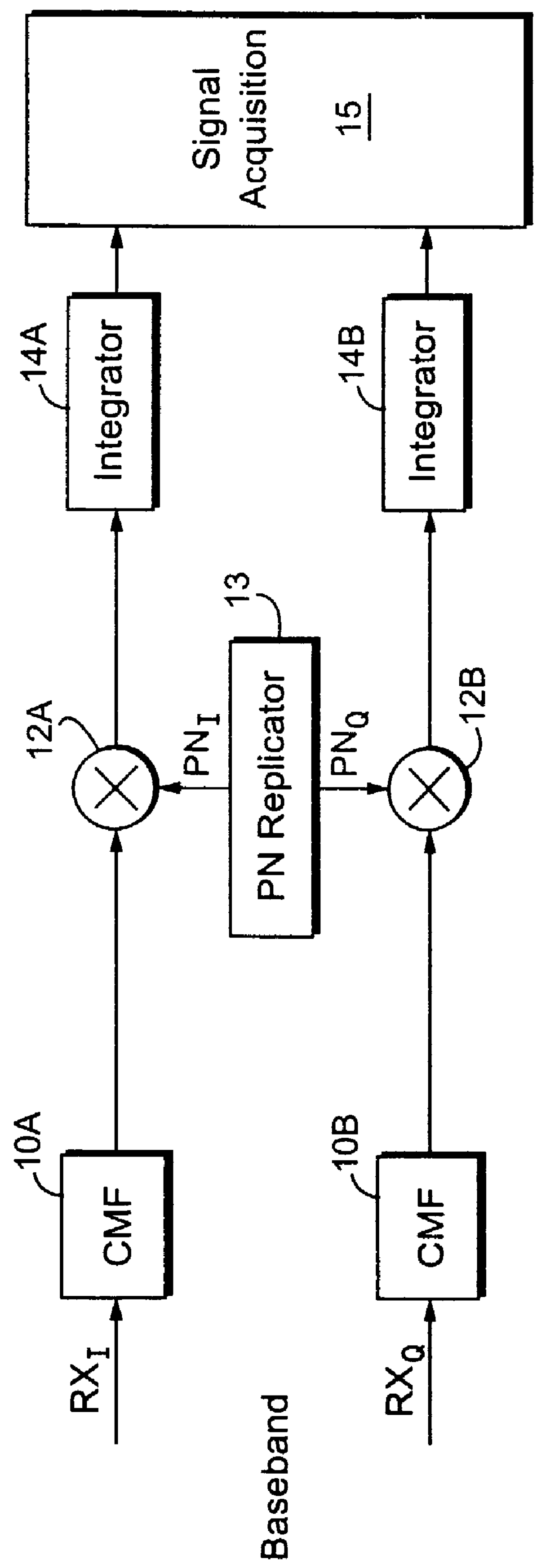
FIG. 1 is a prior art DSSS receiver.

As shown in FIG. 1, incoming signals to a DSSS receiver are usually received as in-phase and quadrature baseband signals, which are first filtered by chip matched filters 10A and 10B according to known methods. In order to discriminate one transmission from another on the frequency spectrum, the pn replicator 13 identifies the pn sequence associated with the particular transmission desired. As described above, once that sequence is identified, it is used to de-spread and yield the desired signal. One conventional method of enabling the pn replicator to identify the pn sequence for a particular communication is to broadcast the unique pn code associated with that communication. The receiver then is responsible for distinguishing one transmission from another by first discriminating the pn code transmitted. The discrimination is frequently performed in conventional systems by digitally matched filters.

Digitally matched filters operate in parallel on the in-phase and quadrature signals (from the outputs of the chip matched filters 10A and 10B). The digitally matched filters discriminate between one transmission and another on the same frequency spectrum by detecting code sequences in the serial data stream. In essence, the matched filters correlate a transmitted code sequence with a copy of the same code sequence to determine the existence of a match condition between the two. The output of the matched filters is not an altered (filtered) copy of the input, but rather a correlation value indicating the level of correlation between a data stream ending at the current match point in the data stream versus the transmitted code sequence.

The preferred embodiment of the present invention employs digitally matched filters in a new way to provide robust signal acquisition at very low signal to noise ratios for differentially coherent DSSS. Robust acquisition is achieved on the complex input signal by four cross-couple digitally matched filters operating simultaneously on the in-phase and the quadrature components as well as the current and previous symbols.

As the artisan will understand, the serial data to be encoded is usually composed of a stream of binary 1s and 0s (or +1s and −1s). Each data value is usually identified as a single symbol. The pn code is a waveform usually consisting of a series of high and low states that transition at a chip rate higher than the symbol rate. That is, the pn code may transition at two or more (usually much more) times the symbol rate. The transmission encoding step multiplies the symbols with the pn code, thus spreading the symbols across a frequency spectrum greater than the symbol rate. The transmission spectrum will be determined by the chip rate and the baseband frequency. As discussed previously, at the receiver, the transmission spectrum is despread using a synchronized replica of the pn code, identified by the digitally matched filters.

Figure 2:
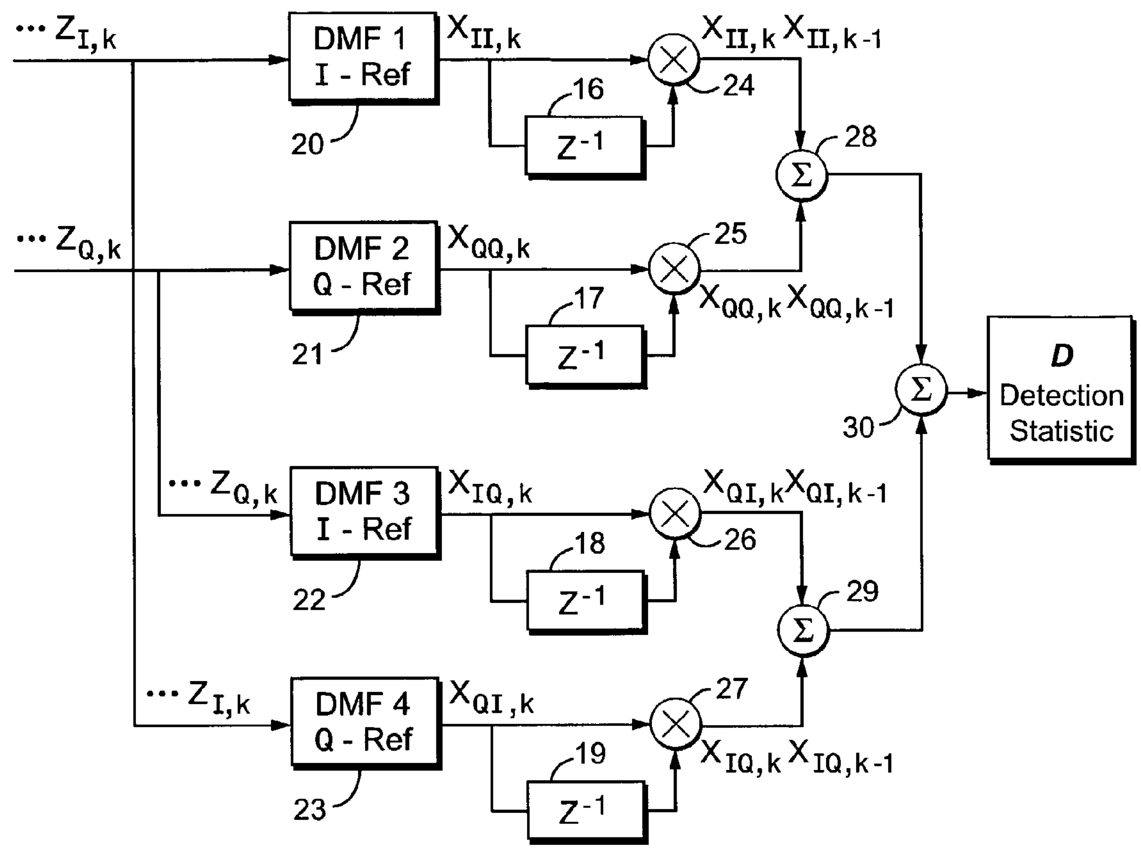
FIG. 2 is a schematic diagram of an example embodiment of the present invention in a DSSS receiver.

In the presently preferred embodiment shown in FIG. 2, the quadrature signal received from the chip matched filters are received as signals $Z_{I,k}$ and $Z_{Q,k}$, where Z represents the chip filtered signals, I and Q represent the respective quadrature aspects of the signal Z, and k represents the present symbol of the signal Z in the series of symbols that comprise the signal Z. As shown, four digitally matched filters 20, 21, 22, and 23 are provided for the two quadrature signals $Z_I$ and $Z_Q$. $Z_I$ for the current symbol k is input to the cross correlated filters 20 and 23. $Z_Q$ for the current symbol k is input to the cross correlated filters 21 and 22. Meanwhile, the filters 20 and 22 are referenced to the I channel and the filters 21 and 23 are referenced to the Q channel.

As a result, digitally matched filter 20, which receives the I channel signal and correlates it to the I channel reference, yields a signal $X_{II,k}$. Similarly, digitally matched filter 21, which receives the Q channel signal and correlates it to the Q channel reference, yields a signal $X_{QQ,k}$. Digitally matched filter 22, which receives the Q channel signal and correlates it to the I channel reference, yields a signal $X_{IQ,k}$. Finally, digitally matched filter 23, which receives the I channel signal and corretates it to the Q channel reference, yields a signal $X_{QI,k}$.

Each of the above filter outputs represent the cross correlated signals for the current symbol, k. The outputs of the correlation functions in the digitally matched filters 20-23 are then multiplied by the correlation outputs of the previous symbols, k−1, for each respective filter 20-23. The correlations for the previous symbols are obtained by the delay/holding blocks 16-19, one for each of the digitally matched filters 20-23, which hold the previous symbol for each filter 20-23, for multiplication with the current symbol in multipliers 24-27.

Finally, the multiplied cross correlation values for previous and current symbols and for the I and Q channels are summed together in the summers 28-30 to yield the detection statistic. The statistic is a value identifying the level of correlation between the data stream and the pn code sequence. The four filter design provides more robust signal acquisition at very low signal to noise ratios.

The decision statistic, obtained at the output of the digitally matched filters 20-23 offers superior performance with respect to severe channel phase distortions. This is believed to result from the minimization of the cross correlated noise in the in-phase and quadrature components. This invention requires that both the in-phase (I) and quadrature (Q) signal components be spread with different spreading sequences, and that cross-correlation terms between the I input with the Q replica and the Q input with the I replica be included in the decision statistic.

The cross correlations between the I and Q input signal components gand the I and Q stored replicas are represented with subscripts as described below.

$X_{II,k}$ Correlation of the I input component at discrete time k with the I reference $X_{II,k-1}$ Correlation of the I input component at discrete time k−1 with the I reference $X_{QQ,k}$ Correlation of the Q input component at discrete time k with the Q reference $X_{QQ,k-1}$ Correlation of the Q input component at discrete time k−1 with the Q reference $X_{IQ,k}$ Correlation of the I input at discrete time k with the Q reference $X_{IQ,k-1}$ Correlation of the I input at discrete time k−1 with the Q reference $X_{QI,k}$ Correlation of the Q input at discrete time k with the I reference $X_{QI,k-1}$ Correlation of the Q input at discrete time k−1 with the I reference With this notation we have then:

$$Z_k = X_{II,k} + jX_{QQ,k}$$

$$Z_{k-1} = X_{II,k-1} + jX_{QQ,k-1}$$

$$Z'_k = X_{QI,k} - jX_{IQ,k}$$

$$Z'_{k-1} = X_{QI,k-1} - jX_{IQ,k-1}$$

The complex conjugate is indicated by $Z^*$, e.g. $Z^*_k = X_{II,k} - jX_{QQ,k}$.

The first differential detection is given by the complex multiplication of the input signal with the corresponding stored replicas for I and Q and a delayed version of the same input signal:

$$\begin{aligned} Z_k \times Z^*_{k-1} &= (X_{II,k} + jX_{QQ,k})(X_{II,k-1} - jX_{QQ,k-1}) \\ &= X_{II,k}X_{II,k-1} - jX_{II,k}X_{QQ,k-1} + jX_{QQ,k}X_{II,k-1} + X_{QQ,k}X_{QQ,k-1} \\ &= (X_{II,k}X_{II,k-1} + X_{QQ,k}X_{QQ,k-1}) - j(X_{II,k}X_{QQ,k-1} - X_{QQ,k}X_{II,k-1}) \end{aligned}$$

The second differential detection is given by the complex multiplication of the input signal with the stored replicas of the cross term, i.e. I with Q and Q with I, and a delayed version of the same input signal $$\begin{aligned} Z'_k \times Z'_{k-1} &= (X_{QI,k} - jX_{IQ,k})(X_{QI,k-1} + jX_{IQ,k-1}) \\ &= X_{QI,k}X_{QI,k-1} + jX_{QI,k}X_{IQ,k-1} - jX_{IQ,k}X_{QI,k-1} + X_{IQ,k}X_{IQ,k-1} \\ &= (X_{QI,k}X_{QI,k-1} + X_{IQ,k}X_{IQ,k-1}) - j(X_{IQ,k}X_{QI,k-1} - X_{QI,k}X_{IQ,k-1}) \end{aligned}$$

The Decision Statistic D is given by sum of the real component of each product:

$$D = Re[Z_k \times Z^*_{k-1}] + Re[Z'_k \times Z'_{k-1}]$$

$$D = X_{II,k}X_{II,k-1} + X_{QQ,k}X_{QQ,k-1} + X_{QI,k}X_{QI,k-1} + X_{IQ,k}X_{IQ,k-1}$$

Figure 3:
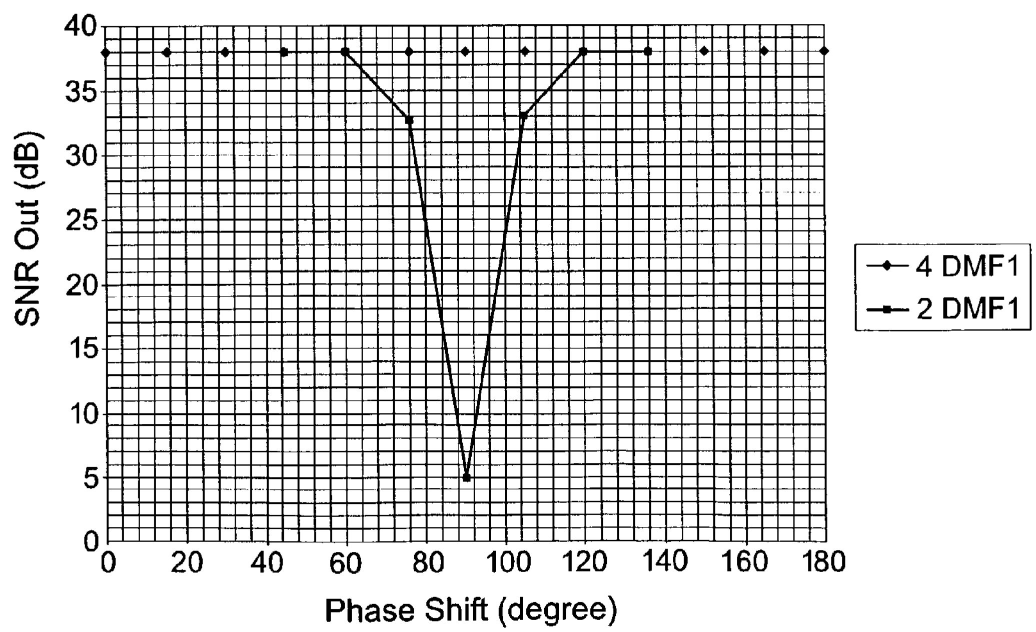
FIG. 3 is graph of a comparison between the signal detection of an example embodiment of the present invention versus the signal detection of a conventional DSSS correlator.

Conventional DSSS systems in comparison provide less robust acquisition. As described above, in conventional DSSS systems, the signal is acquired by a digitally matched filter where the incoming signal is correlated with a replica of the spreading sequence (pn code). That signal acquisition is achieved by detecting the peak integrated energy at the output of the digitally matched filters. In non-coherent or differential systems, incoming signal at time t is correlated with the previous symbol at time t−τ, where τ is the symbol period. That classical differential detection breaks down, however in the presence of severe phase channel distortions at very low signal to noise ratio. This breakdown in the convention differential correlator is shown graphically in FIG. 3, where it can be seen that the signal degrades to the point of losing synchronization (at the deep null). In contrast, in the graph of the present correlator (employing four filters, for the example shown in FIG. 3) no such deep null is demonstrated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A spread spectrum receiver, comprising:

a correlator to cross correlate in-phase and quadrature direct sequence spread spectrum (DSSS) signals (a) for a current symbol, by:

correlating the in-phase DSSS signal for the current symbol relative to a stored replica of the in-phase DSSS signal;

correlating the quadrature DSSS signal for the current symbol relative to a stored replica of the quadrature DSSS signal;

correlating the in-phase DSSS signal for the current symbol relative to a stored replica of the quadrature DSSS signal;

correlating the quadrature DSSS signal for the current symbol relative to a stored replica of the in-phase DSSS signal; and (b) for a previous symbol, by:

correlating the in-phase DSSS signal for the previous symbol relative to a stored replica of the in-phase DSSS signal;

correlating the quadrature DSSS signal for the previous symbol relative to a stored replica of the quadrature DSSS signal;

correlating the in-phase DSSS signal for the previous symbol relative to a stored replica of the quadrature DSSS signal; and correlating the quadrature DSSS signal for the previous symbol relative to a stored replica of the in-phase DSSS signal; and a mixer to mix each of the four cross correlations for the current symbol with corresponding ones of the four cross correlations for the previous symbol; and an adder to combine the associated current and previous symbol cross correlations into a detection statistic.

2. A spread spectrum receiver according to claim 1, wherein:

the correlator includes a digitally matched filter.

3. A spread spectrum receiver according to claim 2, wherein:

the correlator includes a plurality of digitally matched filters, two for each of the in-phase and quadrature DSSS signals.

4. A spread spectrum receiver according to claim 3, wherein:

the two matched filters for the in-phase DSSS signals correlate the in-phase DSSS signals to, respectively, the in-phase and quadrature DSSS signals; and the two matched filters for the quadrature DSSS signals correlate the quadrature DSSS signals to, respectively, the in-phase and quadrature DSSS signals.

5. A spread spectrum receiver according to claim 1, wherein:

the mixer includes storage to hold the cross correlations for the previous symbols for the in-phase and quadrature DSSS signals.

6. A spread spectrum receiver according to claim 5, wherein:

the mixer includes multipliers receiving the outputs of the correlator and the storage and to output a multiplication value of (1) the cross correlations for the current symbols for the in-phase and the quadrature DSSS signals from the correlator and (2) the cross correlations for the previous symbols for the in-phase and quadrature DSSS signals from the storage.

7. A spread spectrum receiver according to claim 6, wherein:

the adder receives and sums the outputs of the multipliers.

8. A spread spectrum receiver according to claim 1, wherein:

(a) the correlator includes:

a first digitally matched filter receiving an in-phase symbol stream and correlating said in-phase symbol stream by referencing the in-phase symbol stream;

a second digitally matched filter receiving a quadrature symbol stream and correlating said quadrature symbol stream by referencing the quadrature symbol stream;

a third digitally matched filter receiving the quadrature symbol stream and correlating said quadrature symbol stream by referencing the in-phase symbol stream;

a fourth digitally matched filter receiving the in-phase symbol stream and correlating said in-phase symbol stream by referencing the quadrature symbol stream;

(b) the mixer includes:

a first storage location to receive an output of the first digitally matched filter corresponding to a previous symbol in the in-phase symbol stream;

a second storage location to receive an output of the second digitally matched filter corresponding to a previous symbol in the quadrature symbol stream;

a third storage location to receive an output of the third digitally matched filter corresponding to a previous symbol in the quadrature symbol stream;

a fourth storage location to receive an output, of the fourth digitally matched filter corresponding to a previous symbol in the in-phase symbol stream; and multipliers to respectively mix the contents of the respective first through fourth storage locations with corresponding outputs of the first through fourth digitally matched filters; and (c) the adder includes:

summers to add the outputs of the multipliers.

9. A method of processing spread spectrum signals, comprising:

cross correlating in-phase and quadrature direct sequence spread spectrum (DSSS) signals for a current symbol, by:

correlating the in-phase DSSS signal for the current symbol relative to a stored replica of the in-phase DSSS signal;

correlating the quadrature DSSS signal for the current symbol relative to a stored replica of the quadrature DSSS signal;

correlating the in-phase DSSS signal for the current symbol relative to a stored replica of the quadrature DSSS signal;

correlating the quadrature DSSS signal for the current symbol relative to a stored replica of the in-phase DSSS signal; and (b) for a previous symbol, by:

correlating the in-phase DSSS signal for the previous symbol relative to a stored replica of the in-phase DSSS signal;

correlating the quadrature DSSS signal for the previous symbol relative to a stored replica of the quadrature DSSS signal;

correlating the in-phase DSSS signal for the previous symbol relative to a stored replica of the quadrature DSSS signal; and correlating the quadrature DSSS signal for the previous symbol relative to a stored replica of the in-phase DSSS signal; and multiplying the current cross correlations for the current symbols with corresponding ones of the cross correlations for the previous symbols; and adding the multiplied cross correlations into a detection statistic.

10. A method according to claim 9, wherein:

the cross correlating includes digitally matched filtering.

11. A method according to claim 10, wherein:

the cross correlating includes correlating the in-phase DSSS signals respectively to the in-phase and quadrature DSSS signals; and the cross correlating includes correlating the quadrature DSSS signals respectively to the in-phase and quadrature DSSS signals.

12. A method according to claim 11, wherein:

the multiplying step includes the step of storing the cross correlations for previous symbols for the in-phase and quadrature DSSS signals.

13. A method according to claim 12, wherein:

the multiplying step includes the step of multiplying the cross correlations for the current symbols for the in-phase and the quadrature DSSS signals with corresponding ones of the cross correlations for the previous symbols for the in-phase and quadrature DSSS signals.

14. A method according to claim 9, wherein:

the cross correlating includes:

correlating the in-phase symbol stream at a first symbol location by referencing the in-phase symbol stream;

correlating the quadrature phase symbol stream at a second symbol location by referencing the in-phase symbol stream;

correlating the quadrature phase symbol stream at the second symbol location by referencing the quadrature phase symbol stream;

correlating the in-phase symbol stream at the first symbol location by referencing the quadrature phase symbol stream;

repeating the correlating steps for other symbols in each of said symbol streams;

multiplying the correlations for said first and second symbols with corresponding ones of said correlations for said other symbols; and adding the results of said multiplying step.

* * * * *